United States Patent
Menard et al.

(10) Patent No.: US 7,552,638 B2
(45) Date of Patent: Jun. 30, 2009

(54) ACCELEROMETER WITH REDUCED EXTRANEOUS VIBRATIONS OWING TO IMPROVED RETURN MOVEMENT

(75) Inventors: Jean-Paul Menard, Pornic (FR); Maurice Moreau, Landemont (FR)

(73) Assignee: Sercel, Carquefou (FR)

( * ) Notice: Subject to any disclaimer, the term of this patent is extended or adjusted under 35 U.S.C. 154(b) by 4 days.

(21) Appl. No.: 11/547,899

(22) PCT Filed: Aug. 11, 2004

(86) PCT No.: PCT/FR2004/002125

§ 371 (c)(1), (2), (4) Date: Dec. 20, 2006

(87) PCT Pub. No.: WO2005/017538

PCT Pub. Date: Feb. 24, 2005

(65) Prior Publication Data

US 2008/0092651 A1    Apr. 24, 2008

(30) Foreign Application Priority Data

Aug. 13, 2003    (FR) .................................. 03 09901

(51) Int. Cl.
*G01P 15/13*    (2006.01)
*G01P 15/125*    (2006.01)

(52) U.S. Cl. ................................. 73/514.18; 73/514.32
(58) Field of Classification Search ............. 73/514.17, 73/514.18, 514.32, 514.36, 514.38
See application file for complete search history.

(56) References Cited

U.S. PATENT DOCUMENTS

| | | | | |
|---|---|---|---|---|
| 6,257,061 | B1 * | 7/2001 | Nonoyama et al. | 73/514.32 |
| 6,301,965 | B1 * | 10/2001 | Chu et al. | 73/514.18 |
| 6,497,149 | B1 * | 12/2002 | Moreau et al. | 73/514.32 |
| 6,543,285 | B2 * | 4/2003 | Hashimoto | 73/504.14 |
| 7,275,433 | B2 * | 10/2007 | Caminada et al. | 73/514.18 |

* cited by examiner

*Primary Examiner*—Helen C. Kwok
(74) *Attorney, Agent, or Firm*—Blakely, Sokoloff, Taylor & Zafman LLP

(57) ABSTRACT

An accelerometer uses variations in capacitance to detect and measure the movement of a moving mass in relation to a fixed part. The accelerometer comprises a first series of electrodes, which are solidly connected to the mass and which are interdigitated with a second series of electrodes. The second series of electrodes are solidly connected to the fixed part. The accelerometer further comprises an electronic circuit which: detects the variation in at least one capacitance between the moving mass and the fixed part, in the form of a moving mass displacement indicator; and also generates an electrostatic stress in order to return the moving mass to the initial position thereof.

14 Claims, 2 Drawing Sheets

ACCELEROMETER WITH REDUCED EXTRANEOUS VIBRATIONS OWING TO IMPROVED RETURN MOVEMENT

This is a non-provisional application claiming the benefit of International application No. PCT/FR2004/002125 filed Aug. 11, 2004.

FIELD OF THE INVENTION

The invention relates to micromachined accelerometers with which the movement of the ground may be measured for geophysical applications (subsoil mapping by a seismic method).

DESCRIPTION OF RELATED ART

The invention notably relates to accelerometers which apply a mass-spring system, in particular when the mass forms a series of fingers which are interdigitated with matching fingers of a fixed part.

In this type of device, each pair of fingers facing each other forms a measuring capacitor.

It will also be recalled here that the fingers forming the capacitors may be used both for measuring displacement by measuring variation of capacitance, and both for returning the mass to its original position, by applying an electrostatic force inside each thereby formed capacitance. The electrostatic return force may be controlled by the previous capacitive measurement of displacement.

The whole of these well-known considerations is described in the prior art, notably in Patent FR 2 769 369.

With this type of accelerometer, the skilled practitioner is typically confronted with the presence of noise superimposed onto the measurement.

In the case of accelerometers incorporating a series of interdigitated electrodes, it is found that a part of the noise stems from vibration which undesirably appears at each finger. This noise which may have various origins, may notably stem from external stress, the frequency spectrum of which covers the vibration frequency of the fingers.

In the particular case of accelerometers with return of the moving part, and notably accelerometers with controlled return, this vibration may additionally be mechanically sustained by restoring forces which are repeatedly applied to the mass. In this case, this vibration produces amplitude modulation of the restoring force, resulting in undesirable noise in the band of interest.

The presence of noise with any of these different origins forms a first problem.

A second problem lies in the fact that the fingers are found to be fragile under flexion. Whether they vibrate in resonance or are simply submitted to strong accelerations, these fingers are subject to damages by flexion.

BRIEF SUMMARY OF THE INVENTION

In order to solve one or both of these problems, the invention consists in an accelerometer with a moving mass and a fixed part which uses variations in capacitance in order to detect the movement of the mass, wherein a first series of electrodes solidly connected to the mass is interdigitated with a series of electrodes solidly connected to the fixed part, each moving electrode forming with an adjacent fixed electrode, a capacitance which varies according to the position of the moving mass, the accelerometer further comprising an electronic circuit provided for detecting the variation in at least one capacitance between the moving mass and the fixed part as an indicator of the movement of the moving mass, and also for generating an electrostatic force for returning the moving mass to its original position, the electronic circuit being provided for generating the electrostatic return stress in such a way that it is automatically controlled by a previous displacement measurement, characterized in that the recurring return stress thus generated is specifically selected such that the mechanical power frequency spectrum thereof has an essential zero power zone at the mechanical resonance frequency of the electrodes of the moving mass and/or of the fixed part.

BRIEF DESCRIPTION OF THE DRAWINGS

Other features, objects and advantages of the invention will become apparent upon reading the detailed description which follows, made with reference to the appended figures wherein.

DETAILED DESCRIPTION OF THE INVENTION

Figure 1:
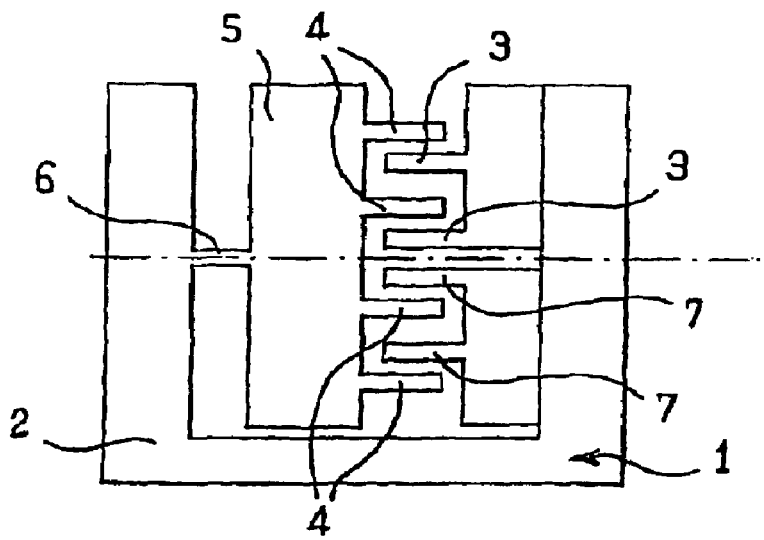
FIG. 1 schematically illustrates a particular embodiment of an acceleration sensor according to the invention.

The acceleration sensor illustrated in FIG. 1 comprises the following components, made in a same semi-conducting substrate 1:
 a fixed frame 2;
 two series of fixed electrodes 3 and 7 solidly connected to the frame 2;
 a series of electrodes 4 supported by a moving plate 5;
 springs 6 connecting the moving plate 5 to the frame 2 (a single spring is illustrated here for the sake of clarity of the drawing).

The moving electrodes 4 are electrically insulated from the fixed electrodes 3 and 7.

The electrodes 3 form a capacitor C1 with the electrodes 4 facing each other. The electrodes 7 form a capacitor C2 with the electrodes 4 facing each other.

When the moving mass is displaced relatively to the fixed part, the values of C1 and C2 vary in the opposite direction. This allows the relative position of the moving mass to be measured. In addition, in the present embodiment, a voltage applied to the terminals of C1 produces an electrostatic force which tends to bring electrodes 3 and 4 closer, therefore to displace the moving mass in one direction, whereas a voltage applied to the terminals of C2 tends to displace the moving mass in the other direction.

An electronic circuit not illustrated here and known to the skilled practitioner, is connected to each series of fixed electrodes 3 and 7 and to the series of moving electrodes 4.

Preferentially of the switched capacitor type, this circuit is clocked at the rate of a clock, and cyclically applies, in successive phases, a measuring voltage to the terminals of each capacitor so that their capacitance (differential measurement of both neighbouring capacitors) may be measured. The measured displacement is indicative of the displacement of the moving plate 5 due to the selectively present acceleration. The duration of the phase for applying a measuring voltage, noted as Tc and also called loading time, or even duration of the detecting phase, is far less than the resonance period of the system (and therefore the vibration period of the ground).

The control set up here consists of cancelling the relative movement of the mass 5 by applying a force between the series of moving electrodes and either one of the series of fixed electrodes (C1 or C2). This is an electrostatic force and this is the actuating phase when the latter is applied in a way temporally distinct from the detecting phase.

Preferentially, it is the same electronic circuit which alternately measures the position of the moving mass and tends to bring it back to its initial position by applying suitable voltages to the terminals of the capacitors C1 and/or C2.

Hence, the circuit defines multiplexing between measurement and feedback, with preferentially a discharge of the capacities between both of these steps.

The multiplexing frequency range for example is 100 to 500 times the resonance frequency of the system.

In another embodiment, returning the moving mass may be accomplished simultaneously to the displacement measurement.

The mechanical chip typically resonates at 500 Hz. The resonance frequency, preferentially selected to be closest to the vibration frequency of the ground, is adjusted by setting an electrostatic stiffness $k_e$ in the present example. This stiffness is superimposed onto the mechanical stiffness and adjusted by the duration of the charging step for measuring capacitances.

Electrostatic stiffness is selected here in order to lower the resonance frequency of the system, the mechanical stiffness being deliberately selected above the high frequency of the band of interest.

With this optional arrangement, known from document FR2 769 309, it is possible to limit collapse, to reduce inter-electrode distance and to therefore use high electric fields (therefore strong electrostatic stiffness).

This arrangement further allows optimization of the performances in the useful bandwidth and compensation of mechanical stiffness dispersion of the moving plate suspension springs, dispersion typically noticed in the usual manufacturing processes.

By the electrostatic stiffness, the apparent frequency is brought back to 140 Hz so as to at best reduce the noise in the useful bandwidth (0-200 Hz).

The fixed and moving electrodes have the shape of "fingers", usually parallelepipedous silicon beams connected together with a base as a comb. Each of these fingers has a resonance frequency corresponding to that of a cantilever beam.

In the present case, the resonance frequency of the fingers typically was 90 kHz and changed to 585 kHz after a first modification as described in the text which follows.

The inventors have identified that these fingers tend to resonate considerably, and this with all the more amplitude as the ambient pressure is very low inside the chip.

The resulting movement is responsible for the folding back of the base band, by frequency transposition of the noise present in the control force, and therefore for the global noise degradation of the geophone, in particular when the maximum compensable acceleration ($A_{max}$) is increased with the actuator.

The spectral components of the respective return signal applied to the mass will be analyzed hereafter.

In order to discuss the means applied for limiting the resonance of the fingers, one first reports the observation here, according to which the repeated control force F, applied to the moving plate 5, is expressed as $F=(\epsilon.S.V^2)/(2.d^2)$ with S: surface facing the electrodes, V: voltage between the electrodes and d: distance between the electrodes. If V and d vary over time, one may write $F(t)=F1(t).F2(t)$ with $F1(t)=V(t)^2$ and $F2(t)=\epsilon.S/2.d(t)^2$.

As a multiplication in the time domain is expressed by a convolution in the frequency domain, one has $F(f)=F1(f)\otimes F2(f)$.

Figure 2A:
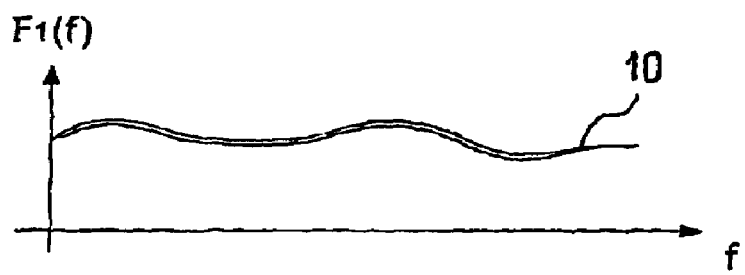
FIGS. 2a-2c are plots illustrating frequency spectra of the noise related to the mass restoration tension, of a transformation function of this force tension with and without resonance of the fingers, and of the resulting force, with and without resonance of the fingers there again.
Figure 2B:
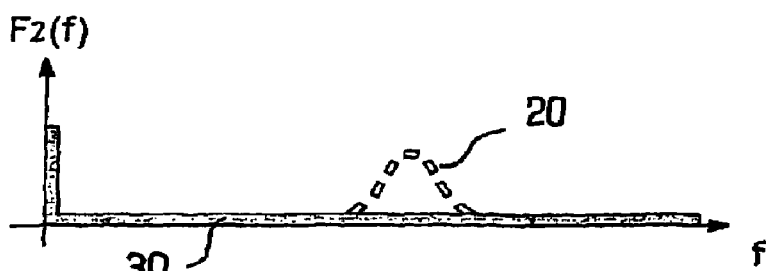
Figure 2C:
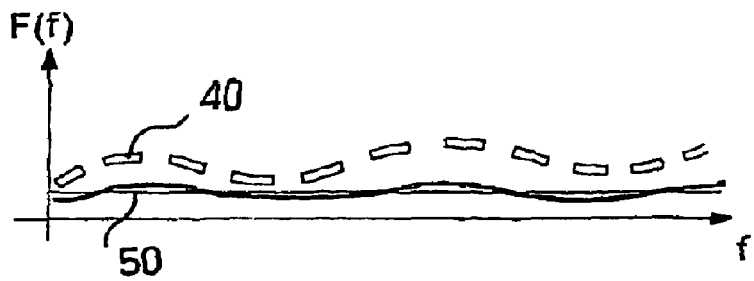

The aspect of F1(f) is illustrated in FIG. 2*a*, by curve 10 (in the absence of an acceleration signal) and that of F2(f) in FIG. 2*b* (curve 20: resonant fingers, curve 30: non-resonant fingers). The aspect of the force spectrum F(f) is also illustrated in FIG. 2*c* (curve 40: resonant fingers and 50: non-resonant fingers).

The rise of undesirable noise in the base band due to the resonance of the fingers is observed.

In other words, the fingers enter into resonance because their eigenfrequency is strongly represented in the power spectrum of the repeated control force as adopted in this type of accelerometer.

Figure 3:
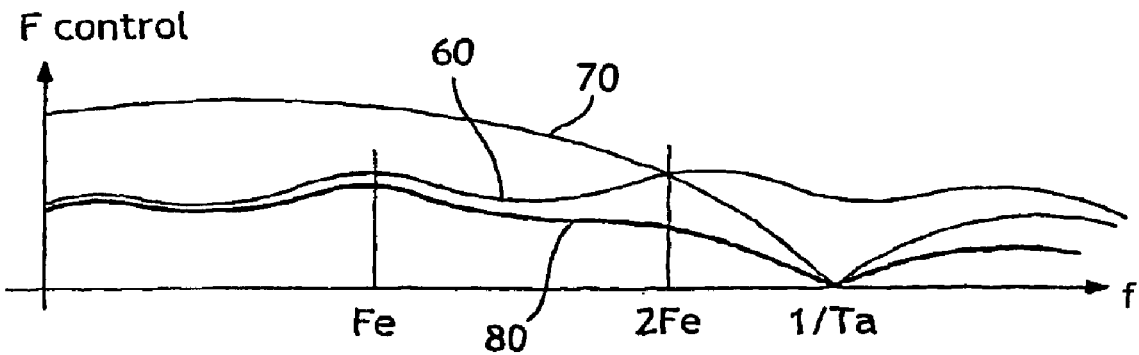
FIG. 3 illustrates the frequency spectra of a pulsed control voltage and a square wave signal windowing this voltage.

Let us note that because of sampling, the spectrum is repeated to infinity with recurrence Fe, the sampling frequency, as illustrated under reference 60 in FIG. 3.

It is interesting to observe that because the feedback force appears as repeated pulses of width Ta and not as Dirac pulses (zero width), this means that this spectrum 60 is multiplied by a cardinal sine function with a first zero frequency of 1/Ta.

In FIG. 3, curve 60 illustrates the frequency control spectrum with short duration pulses (Dirac pulses) and curve 80 with actual pulses of duration Ta therefore with relatively large zones with almost inexistent power. The value of the control force $F_{control}$ is reported in ordinates versus frequency f.

In FIG. 3, curve 70, the frequency transform of the signal with pulses of duration Ta, is a cardinal sine of formula sin(Pi.T.Fa)/(Pi.Fa.Ta). (With a first zero at frequency 1/Ta).

Curve 80 is therefore the result of multiplication of curve 60 by curve 70.

How to make the most of these power dips not utilized up to now is suggested here.

For this, matching is achieved between one of these power dips and the resonance frequency of the fingers.

A first preferential arrangement is to select a positioning of the cardinal sine in order to place a return to zero of the power on the resonance frequency of the fingers, the spectrum resulting from the product then itself having a return to zero at resonance.

This positioning is for example carried out by selecting a suitable value of Ta so that the value 1/Ta is placed on the resonance frequency of the fingers. In the same way, other returns to zero of the cardinal. sine 70 may be used.

It will be noted that this assumes that the frequency of the fingers is higher than Fe, Ta cannot be >Te (Te denotes the sampling period).

By selecting a spectrum placed in this way, a significant gain on the noise level of the accelerometer may be obtained.

According to another arrangement, the fixed and/or moving fingers 3 and 4 are configured so that their resonance is brought back into such a natural power sink, a sink due to application of the forces during duration Ta in the actuating phase, flanked by returns to zero of the restoration force. The preferred frequency for the resonance of the fingers is that equal to 1/Ta, corresponding to the first zero passage of the cardinal sine, the transform of the square wave signal.

Typically, Ta is 14/32 Te, therefore 1/Ta=585 kHz for Fe=256 kHz.

In the parallelepipedous version, in order to increase the frequency of resonance of the fingers in a ratio of 6.5 without reducing the length in the ratio of square root of (6.5), fingers would be needed with a length of 160 μm, which is incompatible with the voltage possibilities of the electronics (to actuate the mass, high voltages would be required).

Figure 4:
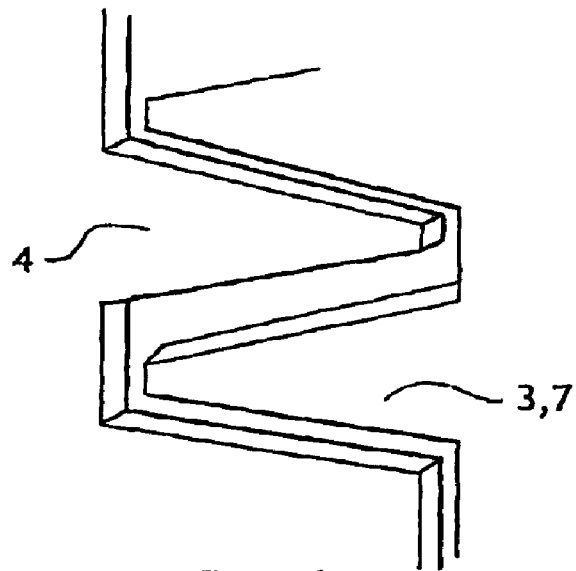
FIG. 4 illustrates interdigitated electrodes according to an alternative of the invention.

In order to change the resonance frequency of the fingers, a trapezoidal profile as illustrated in FIG. 4 is preferentially adopted here.

With fingers having a length of 240 μm, a width L at the anchoring with the value of 20 μm and a width I at the top of 4 μm, a resonance frequency of 585 kHz is achieved typically.

Figure 5:
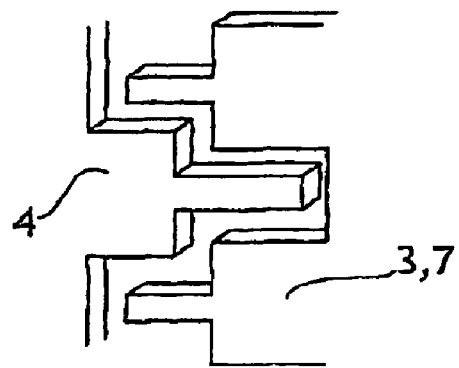
FIG. 5 illustrates interdigitated electrodes according to another alternative of the invention.

Another embodiment, illustrated in FIG. 5, consists of adopting a shape with successive steep reductions in width, towards the free end.

Such an embodiment has additional advantages in that it is easily made with simple cutting machines. Indeed, such a shape of fingers does not require any oblique cut, which facilitates the cutting operation.

Adoption of a wide base for a tapered shape reduces the flexing mass and increases the mechanical strength at the base. The flexural resonance frequency is increased very significantly. Moreover, the amplitudes of oscillations are reduced very significantly. However, the surfaces facing each other between adjacent fingers remain with an almost unchanged extent, thereby practically not affecting the electrical properties of the capacities in presence.

The trapezoidal shape is preferred, as the latter has no rectilinear sub-part and is therefore particularly flexible locally.

A finger alternative with curved edges, for example with an external convex curvature, but which may also be concave, forming a general rounded trapezium shape, is also provided. Such a shape is found to be more compact and has an even higher resonance frequency.

Although a finger shape with decreasing width upon approaching the free end is beneficial to the flexural strength, it may be advantageous to adopt a different shape, notably for shifting the resonance frequency towards a higher frequency.

It should be noted that this geometrical change in the resonance frequency of the fingers, discussed here with reference to an internal vibration source, also allows to do away with vibration sources of other natures.

Thus, in the case of non-controlled accelerometers, and also of non-multiplexed accelerometers (i.e., notably in which return is performed simultaneously with the measurement), by changing the resonance frequency of the fingers, it is possible to do away with frequencies of stresses of external origin.

Thus, the resonance frequencies of the fingers are placed out of the frequency ranges of vibrations of external origin, which otherwise would be active.

It will be noted that the higher the resonance frequency, the lower is the amplitude of the movement.

The invention claimed is:

1. An accelerometer using variations in capacitance to detect the movement of a moving mass, the accelerometer comprising:
   the moving mass and a fixed part;
   a first series of moving electrodes solidly connected to the moving mass and interdigitated with a second series of fixed electrodes solidly connected to the fixed part, wherein each moving electrode forms, with an adjacent fixed electrode, a variable capacitance depending on the position of the moving mass; and
   an electronic circuit, the electronic circuit to detect the variation of at least one capacitance between the moving mass and the fixed part as an indicator of the displacement of the moving mass from an initial position, and to generate an electrostatic repeated return force for returning the moving mass to an initial position, the electronic circuit to generate the electrostatic repeated return force in response to a previous displacement measurement, wherein said electrostatic repeated return force is specifically selected so that a frequency mechanical power spectrum of the electrostatic repeated return force has a substantially zero power zone at the mechanical resonance frequency of the electrodes of the moving mass and of the fixed part.

2. The accelerometer according to claim 1, wherein the electronic circuit performs repeated return of the moving mass in time slots (Ta), wherein a frequency transform of a corresponding square wave signal has a return to substantially zero at the resonance frequency of the electrodes of the moving mass and of the fixed part.

3. The accelerometer according to claim 2, wherein an average slot time (Ta) is predetermined so that the frequency transform of the square wave signal has a return to substantially zero (1/Ta) at the resonance frequency of the electrodes of the moving mass and of the fixed part.

4. The accelerometer according to claim 3, wherein the average slot time (Ta) is selected so that the frequency transform of the square wave signal has a first return to zero (1/Ta) at the resonance frequency of the electrodes of the moving mass and of the fixed part.

5. The accelerometer according to claim 1, wherein the electrostatic return force is applied in time slots with an average width Ta, and wherein Ta is selected according to the relationship 1/Ta=F where F is the resonance frequency of the electrodes of the moving mass and of the fixed part.

6. The accelerometer according to claim 3, wherein the frequency transform of the square wave signal has the shape of a cardinal sine.

7. The accelerometer according to claim 1, wherein the electrode(s) of the moving mass and/or the fixed part each have a section, the width of which varies towards their free end.

8. The accelerometer according to claim 7, wherein the electrodes of the moving mass and/or of the fixed part have at least one part with a continuous change in section width.

9. The accelerometer according to claim 7, wherein the electrodes of the moving mass and/or the fixed part have at least one part, the section width of which has steep changes.

10. The accelerometer according to claim 7, wherein the electrodes of the moving mass and/or the fixed part have at least one part, the section width of which decreases towards the free end of the relevant electrode.

11. The accelerometer according to claim 7, wherein the electrodes of the moving mass and/or the fixed part include a trapezoidal shape with decreasing width (L,I) towards their free end.

12. The accelerometer according to claim 7, wherein the electrodes of the moving mass and/or the fixed part include apart, the section width of which varies with steps of constant width, the width (L,I) steeply changing between each step.

13. The accelerometer according to claim 7, wherein the electrodes of the moving mass and/or the fixed part include apart, the width of which gradually decreases towards the free end of the electrode by forming at least one rounded side edge.

14. The accelerometer according to claim 7, wherein the electrodes of the fixed part have a complementary shape to the gap located between two adjacent electrodes of the moving mass.

* * * * *

UNITED STATES PATENT AND TRADEMARK OFFICE
CERTIFICATE OF CORRECTION

Page 1 of 1

PATENT NO.       : 7,552,638 B2
APPLICATION NO.  : 11/547899
DATED            : June 30, 2009
INVENTOR(S)      : Menard et al.

It is certified that error appears in the above-identified patent and that said Letters Patent is hereby corrected as shown below:

Column 8, Claim 12, line 55, delete "apart" and insert -- a part --

Signed and Sealed this
Tenth Day of May, 2011

David J. Kappos
*Director of the United States Patent and Trademark Office*